United States Patent [19]

Aule et al.

[11] Patent Number: 4,542,034

[45] Date of Patent: Sep. 17, 1985

[54] METHOD FOR HEAT TREATMENT OF MILK AND THE LIKE

[75] Inventors: Olaf Aule, Bandhagen; Tommy Norén, Tumba, both of Sweden

[73] Assignee: Alfa-Laval AB, Tumba, Sweden

[21] Appl. No.: 700,340

[22] Filed: Feb. 12, 1985

Related U.S. Application Data

[63] Continuation of Ser. No. 406,824, Aug. 10, 1982, abandoned, which is a continuation-in-part of Ser. No. 204,130, Nov. 5, 1980, abandoned.

[51] Int. Cl.[4] ................................................. A23C 1/00
[52] U.S. Cl. ...................................... 426/522; 165/66
[58] Field of Search ................... 426/522, 520; 165/66

[56] References Cited

U.S. PATENT DOCUMENTS

| 1,798,413 | 3/1931 | Graves | 426/522 |
|---|---|---|---|
| 2,159,110 | 5/1939 | Swarr | 165/66 |
| 2,539,125 | 1/1951 | Froding | 426/522 |
| 3,364,038 | 1/1968 | Bartlett | 426/522 |

Primary Examiner—George Yeung
Attorney, Agent, or Firm—Townsend & Townsend

[57] ABSTRACT

A method for heat treating a continuous flow of milk. Within a short period of time after milking the animal the still-warm milk is preheated in a regenerative heat exchanger. The preheated milk is then heated to, preferably, a pasteurization temperature. The heated milk is maintained at the pasteurization temperature for a required pasteurization time and is then passed through the regenerative heat exchanger to preheat the newly collected milk. The pasteurized milk, its temperature lowered by passage through the regenerative heat exchanger, is the preferably cooled before passing into a cooled storage tank.

5 Claims, 1 Drawing Figure

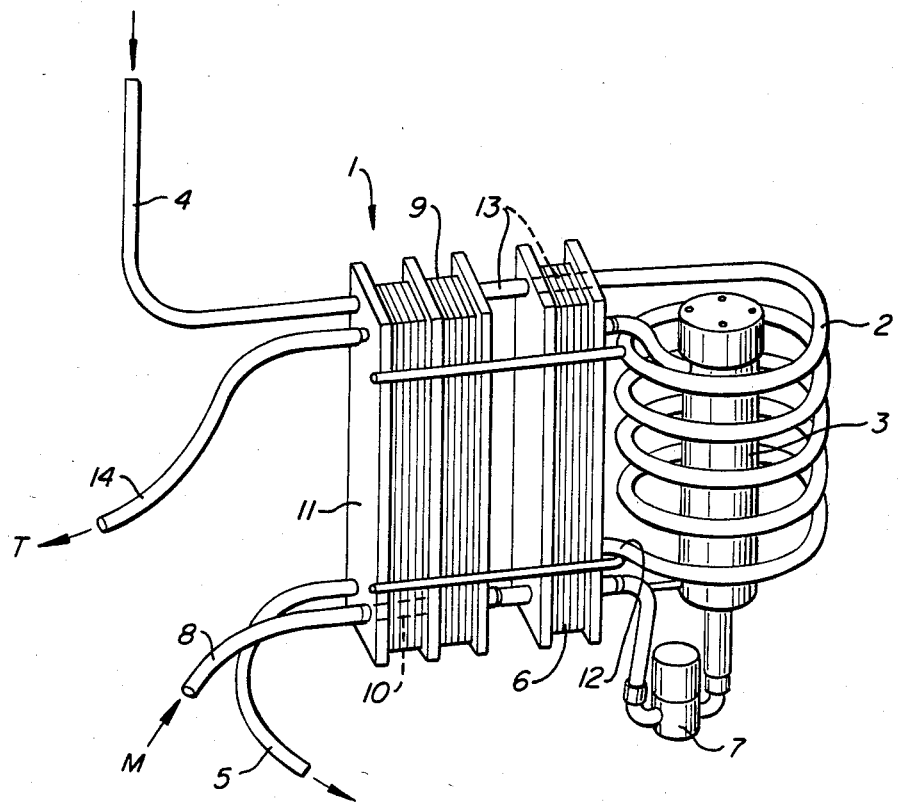

METHOD FOR HEAT TREATMENT OF MILK AND THE LIKE

This is a continuation of application Ser. No. 406,824, filed Aug. 10, 1982, abandoned, which was a continuation-in-part of U.S. patent application Ser. No. 204,130 filed on Nov. 5, 1980, abandoned.

BACKGROUND OF THE INVENTION

The present invention is related to milk pasteurization and storage, in particular a heat treatment method in which milk is pasteurized and cooled within minutes of being obtained from the animal to increase its shelf life.

Milk is usually stored by the producer in cooled tanks shortly after being obtained from the animals. Cooling the milk helps to inhibit the growth of microorganisms. After a sufficient quantity of milk is contained within the tank, the milk is taken from the producer to the dairy. After the milk arrives at the dairy or like plant, it is heated to kill most microorganisms during pasteurization. After pasteurization it is again cooled. Therefore in the usual case the milk is heated only after it reaches the dairy during pasteurization.

However, this storage in tanks, which is becoming more and more common and the purpose of which is to rationalize and minimize the number of collecting turns, involves the drawback that milk will be kept for a comparatively long time before being subjected to the heat treatment. Though the storage tanks are cooled growth of bacteria can arise; this cannot be accepted either from a hygienic point of view or in view of the quality of the milk or products prepared from the milk. It may be mentioned in this connection that even a very small volume of bacteria-affected goat milk mixed into a larger volume can render the entire milk volume unusable for manufacture of cheese.

SUMMARY OF THE INVENTION

The present invention solves the problems associated with the prior art method of simply cooling the newly obtained raw milk at the producer by immediately heating the milk to a temperature and for a time sufficient to pasteurize it, using the heated milk to preheat incoming raw milk and then cooling the pasteurize milk. The cooled milk is maintained at about 2°-6° C. while awaiting transport to a dairy.

The method of the present invention is carried out in an economical manner by an apparatus which reduces the risk of growth of bacteria at an as early stage as possible in the milk handling cycle. The apparatus includes a regenerative section in the heat exchanger, which includes a heating section and a regenerative section, has a space intended to be traversed by incoming, untreated milk, and a space intended to be traversed by heated milk coming from the heating section, that the holding vessel consists of a coil which, as seen in the flow direction, is arranged between the heating section and the regenerative section and has a variable length, adjusted to the intended flow and required holding time, and that the apparatus is adapted to be placed in immediate connection with a milking plant so that the milk arrives in the apparatus at a substantially maintained milking temperature.

The apparatus is preferably connected to the milking apparatus. This allows the milk to be heat-treated immediately upon milking, whereby the risk of growth of bacteria in the storage tank will be reduced to the utmost extent. A result of this is that the milk can be kept in the tank for a considerably longer time and, consequently, the number of collecting operations can be reduced and the time interval between the collecting operations can be increased. An advantage of this is that even producers with small number of livestock can utilize the obvious advantages involved with the tank storage. Another advantage of the apparatus according to the invention is that, due to its construction, it requires a minimum supply of energy.

The invention will be described more fully below with reference to the accompanying drawing, which is a schematic perspective view of a preferred embodiment of the apparatus. The drawing only includes such details as are essential for the function of the apparatus and, consequently, such components as are common in this connection have been left out for the sake of clarity.

BRIEF DESCRIPTION OF THE DRAWING

The FIGURE is a simplified view of apparatus designed to carry out the method of the present invention.

DETAILED DESCRIPTION OF THE PREFERRED EMBODIMENT

The illustrated embodiment of apparatus for carrying out the method of the invention is intended to be connected between a milking plant M, preferably after the final unit or collecting container thereof, and a storage tank T. The storage tank T is preferably one which can maintain the treated milk at about 2°-6° C.

The apparatus disclosed includes a heat exchanger 1 consisting of three sections, a holding vessel 2, an electrical water-heater 3 with a circulation pump, thermostat means and control means (not shown), and inlet and outlet lines 4, 5 for cooling water provided with necessary valves.

In a disclosed embodiment the heat exchangers are plate type heat exchangers arranged for counter-current heat exchange.

The heating section 6 of the heat exchanger has spaces which are traversed by milk or other liquid to be treated, and spacers which are traversed by heated water and spaced apart by the plates.

The water is heated in the water-heater 3 and is circulated between this and the heat exchanger section 6 with the aid of a pump 7. The water-heater is provided with electrical heating elements, preferably a constantly active element for holding the temperature generally within the intended temperature range and a thermostat-controlled element for adjusting the temperature to the desired exact value.

Unlike prior art heat treatment apparatuses this one is intended to be used with freshly obtained milk, i.e. milk that has not been cooled. The freshly obtained milk preferably has been collected within a couple of hours from milking the animal. It is desired to minimize the time period between milking and processing, keeping it to an hour or less. The milk is thus about 34°-37° C. already when arriving in the regenerative section 9 of the heat exchanger via the supply line 8. The milk passes at 10 straight through the cooling section 11.

In the regenerative section 9 the milk is heated up from 34°-37° C. to about 50° C. by heat being absorbed from earlier heated milk which has already passed through the heating section 6 and the holding vessel 2 situated after the heating section, as counted in the flow direction. From the regenerative section 9 the milk passes into the heating section 6, where it comes into contact with the plates heated by the hot water, and is heated to the intended temperature about 72° C.

The heating of the milk thus takes place in two steps. In the first step heating from the initial temperature 34°-37° C. up to a temperature of about 50° C. takes place by absorption of heat from outgoing milk. In the other step heating from about 50° C. to about 72° C. takes place by heat absorption from the water heated in the water-heater 3.

The holding vessel 2 has been placed after the heating section 6 since the milk must be held at the high temperature for a certain time in order to achieve the intended destruction of bacteria and the like. In the preferred embodiment the holding vessel consists of a coil of tubing connected to the outlet 12 of the heating section 6 and opening into a passage pipe 13 which extends transversely through the heating section 6. The holding vessel can be varied as required because it is in the form of a coil. Decisive for the length of the holding vessel coil 2 are the flow rate, i.e. the volume of milk passing through the apparatus per unit of time, and the desired holding time.

If the milk is to be kept at a temperature of 72° C. for, say fifteen seconds, the length of the holding vessel coil 2 is adjusted so that the time fifteen seconds is required for a certain quantity of milk to pass the coil. It is usually desired that the milk be heated to a sufficient temperature for a sufficient time to pasteurize it according to existing standards.

The holding vessel is decisive for the function of the apparatus and determines the capacity of it. On the other hand, by adjusting the coil length it is possible to adapt any apparatus to a given flow provided it lies within the capacity of the heat exchangers and the water-heater.

From the holding vessel coil 2 the milk is led via the passage pipe 13 to the regenerative section 9, where it yields heat to incoming milk, before it is allowed to pass through the cooling section 11 in which it is cooled to the intended storage temperature with the aid of cooling water which enters through the conduit 4 and leaves through the conduit 5.

Since the apparatus is supplied with already warm, newly-milked, milk and by the use of regenerative heat exchange to reuse heat from already heat-treated milk, the required addition of energy is minimized. In this connection it may be anticipated that a power of about 5 watt will be required for one liter of treated milk.

The milk has a temperature of about 40° C. when it passes from the regenerative section 9 into the cooling section 11. In the latter section it is cooled to about 4°-10° C. above the temperature of the cooling water passing into cooling section 11 through line 4. The conduit 14 from the cooling section may be directly connected to the storage tank T into which the milk thus enters after being cooled within section 11.

It is preferred that the pasteurized and cooled milk passing into tank T be cooled to a temperature approximating the temperature of the tank. Depending upon the temperature of the available cooling water, as well as other factors, it may therefore be desired to pre-cool the water entering line 4.

The spent cooling water, the temperature of which has been raised by about 20°-25° C., may be utilized as drinking water for the livestock or else be kept in a special tank from which the preheated water is supplied to a water-heater for consumption water.

Pasteurization of milk occurs when the milk is heated to a sufficiently high temperature for a sufficiently long time to kill certain bacteria. Thus heating milk to 76° C. for 2 seconds, 72° C. for 15 seconds or 68° C. for 90 seconds is generally considered to be equally effective.

The chart below lists the test results obtained at Alfa Laval Laboratories in Sweden. It illustrates how effective the method of the present invention is in stabilizing milk. It should be noted that heating the milk at 68° C. for 17 seconds, which is not generally considered to truely pasteurize it, suppresses bacterial growth so that after 14 days the bacterial count is only at the level of the control at the start of the test.

| | Number of Bacteria per ml Milk Before and After Storage | | |
|---|---|---|---|
| Temp (°C.) | Storage Time (Days) at 4-6° C. | | |
| Time: 17 sec | 0 | 8 | 14 |
| Unheated control | 10,200 | 15 mill. | 49 mill. |
| 66 | 240 | 180 | 7 mill. |
| 68 | 220 | 120 | 10,200 |
| 70 | 50 | 10 | 10 |
| 72 | 40 | 40 | 10 |
| 74 | 20 | 20 | 10 |

The present invention is calculated to find its widest use in combination with handling of milk in tanks. However, the apparatus is usable to the same degree in case it is desired to distribute the milk directly from the producer to the consumer/retailer. In such cases the apparatus is connected to a packaging unit for direct packaging of milk.

In a somewhat modified embodiment, especially concerning the cooling section, the apparatus of the invention may be applied to the tank vehicle collecting the milk from the producer's tanks. Milk being filled into the vehicle tank will thus be automatically heat-treated when it is pumped over. Any growth of bacteria that may have began in the producer's tank is thus interrupted and infection of the remaining milk in the vehicle tank is prevented.

The present invention may also be used in fields other than in the handling of milk. It may be used, for instance, in the brewery industry for destruction of yeast fungi and for general pasteurization of beer and like beverages as well as juices. The invention may also be used in the wine industry for the deposition of tartar. In the engineering industry they may be used for "pasteurization" of cutting liquids and be reutilized repeatedly without making it necessary to add bactericides which may give rise to skin-affections.

Finally, the apparatus may be utilized for treatment of drinking-water in e.g. the developing countries.

Modification and variation can be made to the disclosed method without departing from the subject of the invention as defined in the following claims.

We claim:

1. A method for heat treating milk, said method employing a treatment apparatus including:
   a first plate heat exchanger;
   a second plate heat exchanger;
   tubing having a predetermined length connecting the first plate heat exchanger with the second plate heat exchanger; and
   a third plate heat exchanger;
   said method comprising:
   directing a raw milk stream to the first plate heat exchanger within less than one hour from collection from milk-producing animals, whereby the raw milk stream is heated by exchange with a heated milk stream, to produce a heated raw milk stream;

directing the heated raw milk stream from the first plate heat exchanger to the second plate heat exchanger, whereby the raw milk is further heated by exchange with a heating medium to produce the heated milk stream in the second exchanger;

flowing the heated milk stream through the tubing from the second plate heat exchanger to the first plate heat exchanger, whereby the heated milk is retained at an elevated temperature for a period of time determined by the length of the tubing and the flowrate of the milk and whereby the heated milk stream provides a heat source for heating the raw milk in the first plate heat exchanger;

directing the heated milk stream from the first plate heat exchanger to the third plate heat exchanger, whereby the heat milk stream is cooled by exchange with a cooling medium in the third exchanger.

2. A method as in claim 1, wherein the raw milk is heated to a temperature of about 50° C. in the first heat exchanger.

3. A method as in claim 1, wherein the raw milk is heated to a elevated temperature in the range from about 68° C. to 74° C. in the second heat exchanger.

4. A method as in claim 3, wherein the heated milk is maintained at the elevated temperature for a period in the range from 2 to 90 seconds by passage through the tubing connecting the second heat exchanger to the first heat exchanger.

5. A method as in claim 1, wherein the heated milk is cooled to a temperature in the range from about 68° to 74° C. in the third heat exchanger.

* * * * *